(12) United States Patent
Inokuchi et al.

(10) Patent No.: US 12,128,764 B2
(45) Date of Patent: Oct. 29, 2024

(54) VEHICLE

(71) Applicant: TOYOTA JIDOSHA KABUSHIKI KAISHA, Aichi-ken (JP)

(72) Inventors: Takaaki Inokuchi, Nagoya (JP); Tsutomu Miyazaki, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 250 days.

(21) Appl. No.: 17/726,452

(22) Filed: Apr. 21, 2022

(65) Prior Publication Data
US 2022/0396146 A1   Dec. 15, 2022

(30) Foreign Application Priority Data

Jun. 9, 2021 (JP) .................. 2021-096830

(51) Int. Cl.
*B60K 28/14* (2006.01)
*B60K 28/00* (2006.01)

(52) U.S. Cl.
CPC ........ *B60K 28/14* (2013.01); *B60K 2028/003* (2013.01)

(58) Field of Classification Search
CPC .............. B60K 28/14; B60K 2028/003; F02D 2200/0414; F02D 2200/70; F02D 41/042; F02D 41/1452; F02D 41/22; F02D 29/02; F02N 2200/12; F02N 2200/122; F02N 11/0807
See application file for complete search history.

(56) References Cited

U.S. PATENT DOCUMENTS

| 2006/0068973 A1 | 3/2006 | Kappauf et al. |
| 2008/0117079 A1* | 5/2008 | Hassan ................. F02N 11/101 340/901 |
| 2013/0110376 A1 | 5/2013 | Surnilla et al. |
| 2020/0122549 A1 | 4/2020 | Seki et al. |

FOREIGN PATENT DOCUMENTS

| CN | 103089467 A | 5/2013 |
| JP | 2007-051646 A | 3/2007 |
| JP | 2010229867 A * | 10/2010 |
| JP | 2012-163016 A | 8/2012 |
| JP | 2016-507792 A | 3/2016 |
| JP | 2020-066301 A | 4/2020 |
| WO | 2009/067965 A1 | 6/2009 |
| WO | 2013/172011 A1 | 11/2013 |
| WO | 2014/141618 A1 | 9/2014 |

OTHER PUBLICATIONS

Machine Translation of JP2010229867A PDF File Name: "JP2010229867A_Machine_Translation.pdf".*

* cited by examiner

*Primary Examiner* — Grant Moubry
*Assistant Examiner* — Ruben Picon-Feliciano
(74) *Attorney, Agent, or Firm* — HAUPTMAN HAM, LLP

(57) ABSTRACT

In a case where a determination is made, after an engine is started based on a remote operation, that an ambient environment of a vehicle is not a predetermined appropriate environment based on a detection value from an ambient environment detection sensor configured to detect the ambient environment of the vehicle, the engine is stopped. As a result, it is possible to suppress a deterioration of an environmental state around the vehicle or an occupant cabin. As a result, it is possible to take more appropriate measures when the engine is started based on the remote operation.

5 Claims, 4 Drawing Sheets

VEHICLE

CROSS-REFERENCE TO RELATED APPLICATION

This application claims priority to Japanese Patent Application No. 2021-096830 filed on Jun. 9, 2021, incorporated herein by reference in its entirety.

BACKGROUND

1. Technical Field

The present disclosure relates to a vehicle, and more particularly to a vehicle that can start an engine based on a remote operation.

2. Description of Related Art

In the related art, as such a type of vehicle, a vehicle provided with detection means for detecting a type and a position of an object present around the vehicle has been proposed (see, for example, Japanese Unexamined Patent Application Publication No. 2012-163016 (JP 2012-163016 A)). In this vehicle, in a case where the type of the object detected by the detection means when an operation of starting the engine by the user is detected is a predetermined type, and the position of the object is within a predetermined range determined by the type, an engine start is held. In this case, in a case where the technology is applied when the object detected by the detection means is a person and the person is present within the predetermined range from the vehicle, it is possible to hold the engine start when a person is present nearby.

SUMMARY

In recent years, a vehicle has been proposed in which an engine is started by a remote operation to warm up the engine or execute air conditioning of a vehicle cabin. There is no problem in the engine start by the remote operation when the vehicle is parked outdoors, but when the vehicle is parked indoors, a good environmental state indoors or in an occupant cabin may not be maintained due to the exhaust. Therefore, in a case where the engine is started by the remote operation, it is needed to execute a process different from a process in a case where the engine is started by getting on the vehicle.

A vehicle according to an aspect of the present disclosure is to take more appropriate measures when an engine is started based on a remote operation.

The vehicle of the aspect of the present disclosure employs the following means.

An aspect of the present disclosure relates to a vehicle including an engine, and a controller. The controller is configured to start the engine based on a remote operation. The controller is configured to stop the engine in a case where a determination is made that an ambient environment of the vehicle is not a predetermined appropriate environment based on a detection value from an ambient environment detection sensor configured to detect the ambient environment of the vehicle, after the engine is started based on the remote operation.

In the vehicle according to the aspect of the present disclosure, in a case where the determination is made, after the engine is started based on the remote operation, that the ambient environment of the vehicle is not the predetermined appropriate environment based on the detection value from the ambient environment detection sensor configured to detect the ambient environment of the vehicle, the engine is stopped. As a result, it is possible to suppress a deterioration of an environmental state around the vehicle or an occupant cabin. As a result, it is possible to take more appropriate measures when the engine is started based on the remote operation.

In the vehicle according to the aspect of the present disclosure, the ambient environment detection sensor may be an outside air temperature sensor or a carbon monoxide concentration sensor mounted on the vehicle. In addition, the vehicle according to the aspect of the present disclosure, the ambient environment detection sensor may be an outside air temperature sensor or a carbon monoxide concentration sensor installed outside the vehicle, and the controller may be configured to acquire the detection value from the ambient environment detection sensor by communication.

In the vehicle according to the aspect of the present disclosure, the controller may be configured to relax a condition for stopping the engine in a case where the engine is started based on a switch operation in an occupant cabin, as compared to a case where the engine is started based on the remote operation. That is, when a driver starts the engine by operating a switch in the occupant cabin, the engine can be stopped by the determination of the driver, so that there is no problem even when the condition for stopping the engine is relaxed. On the other hand, when the engine is started based on the remote operation, the driver (person) cannot directly confirm the environmental state around the vehicle or the environmental state of the occupant cabin, so that it is not possible to relax the condition for stopping the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, a mode for carrying out the present disclosure will be described with an embodiment.

Figure 1:
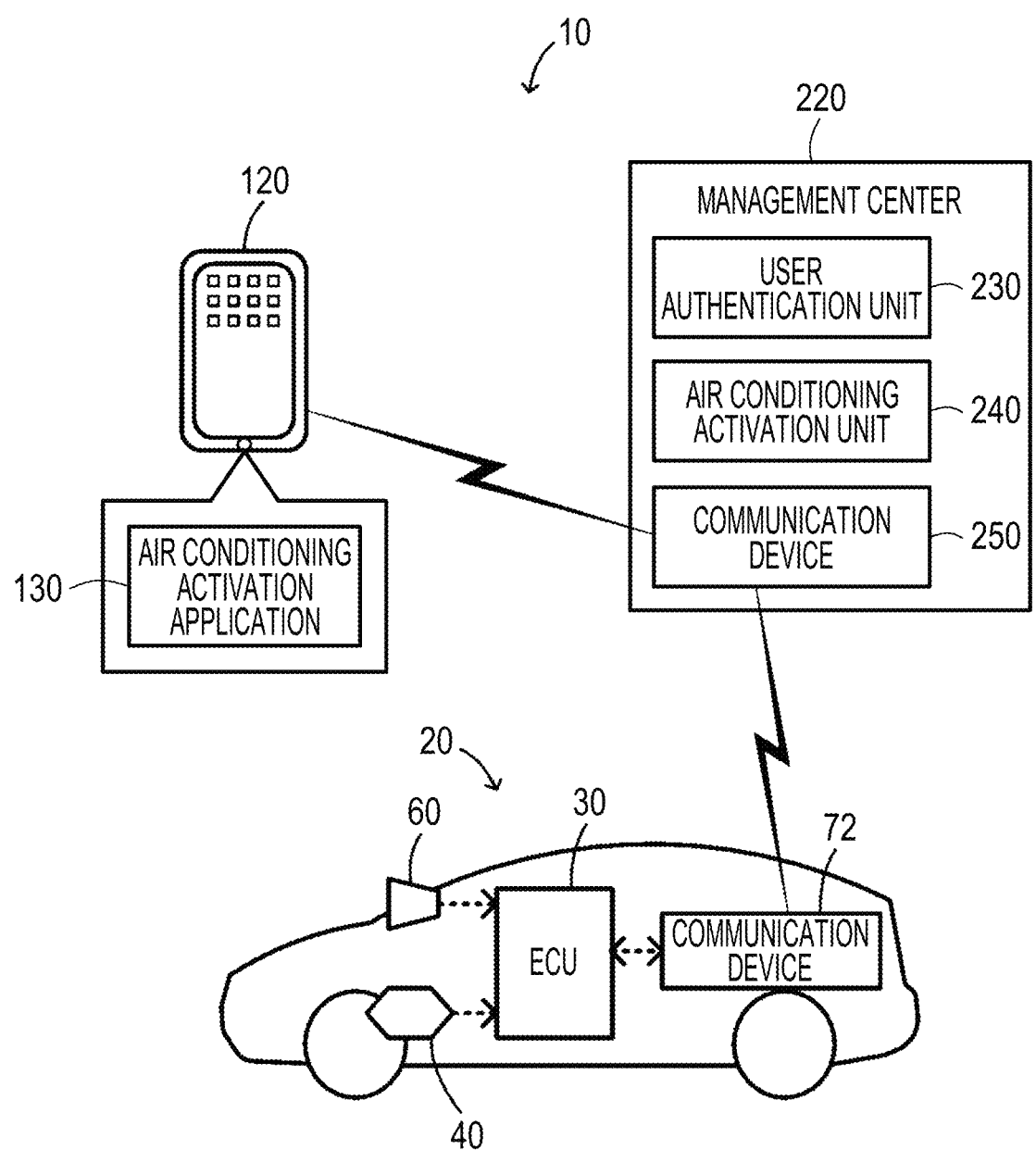
FIG. 1 is a configuration diagram showing an outline of a configuration of an information management system 10 having a vehicle 20 as an embodiment of the present disclosure.
Figure 2:
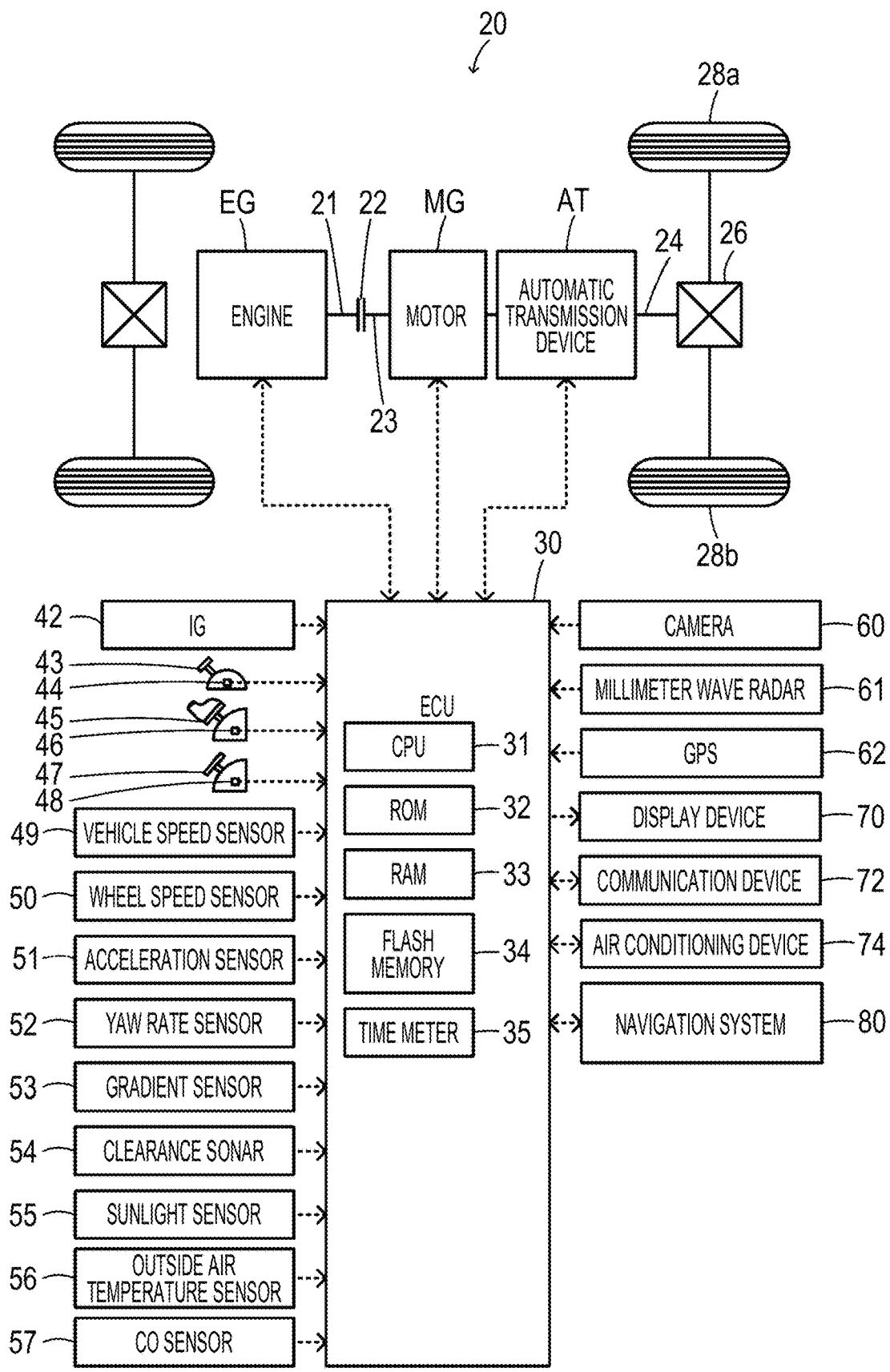
FIG. 2 is a configuration diagram showing an outline of a configuration of the vehicle 20 according to the embodiment.

FIG. 1 is a configuration diagram showing an outline of a configuration of an information management system 10 having a vehicle 20 as the embodiment of the present disclosure, and FIG. 2 is a configuration diagram showing an outline of a configuration of the vehicle 20 according to the embodiment. As shown in FIG. 1, the information management system 10 according to the embodiment includes the vehicle 20, a portable terminal 120, and a management center 220.

The vehicle 20 includes, as shown in FIG. 2, an engine EG, a motor MG, and an automatic transmission device AT. The engine EG is configured as an internal combustion engine driven by using a hydrocarbon-based fuel, such as gasoline or light oil, and an output shaft 21 of the engine EG is connected to an input shaft 23 of the automatic transmission device AT via a clutch 22. The motor MG is configured as, for example, a synchronous motor generator, and a rotor of the motor MG is connected to the input shaft 23 of the automatic transmission device AT. The motor MG is driven by converting direct current power from a battery (not shown) into three-phase alternating current power by an inverter (not shown) and applying the converted current power. The automatic transmission device AT is configured as, for example, a hydraulically driven transmission having six forward gears and one reverse gear and including a torque converter and the automatic transmission, and a drive shaft 24 as the output shaft of the automatic transmission device AT is connected to drive wheels 28a, 28b via a differential gear 26.

The vehicle 20 includes various sensors 40, a camera 60, a millimeter wave radar 61, a global positioning system (GPS) 62, a display device 70, a communication device 72, an air conditioning device 74 that executes air conditioning of the occupant cabin, a navigation system 80, or an electronic control unit 30.

Examples of the various sensors 40 include sensors that detect a state of the vehicle or an ambient situation, such as a vehicle speed sensor 49, a wheel speed sensor 50, an acceleration sensor 51, a yaw rate sensor 52, a gradient sensor 53, a clearance sonar 54, a sunlight sensor 55, an outside air temperature sensor 56, or a carbon monoxide concentration sensor (CO sensor) 57.

A plurality of the cameras 60 is disposed such that a front, a rear, or a side of the vehicle can be imaged. The camera 60 may have a function as a drive recorder that stores, for example, a vehicle speed, global positioning system (GPS) data, and a time together with the captured image. The communication device 72 communicates with the management center 220 via a wireless communication network, or receives various information via the Internet. The air conditioning device 74 executes the air conditioning in the vehicle cabin.

The navigation system 80 is a system that guides own vehicle to a set destination, and includes a map information database or a display unit (not shown). The map information database stores, as map information, a road surface pavement state of a road in each section, a width of the road, the number of lanes, a width of a sidewalk, a direction in which the vehicle can travel, a legal speed, or the like. When the destination is set, the navigation system 80 sets a route and executes route guide based on information on the destination, information on a current location (current position of own vehicle) acquired by the GPS 62, and information stored in the map information database.

The electronic control unit 30 is a microcomputer configured with a CPU 31 as a center, and includes, in addition to the CPU 31, a ROM 32 that stores a program and the like, a RAM 33 that transitorily stores data, a flash memory 34 that stores data and the like, a time meter 35 having a timer function and the like, or an input and output port (not shown).

Signals from the various sensors are input to the electronic control unit 30 via the input port. Examples of the signals input to the electronic control unit 30 via the input port include an ignition signal from an ignition switch 42, a shift position from a shift position sensor 44 that detects a position of a shift lever 43, an accelerator operation amount from an accelerator pedal position sensor 46 that detects a stepping amount of an accelerator pedal 45, and a brake position from a brake pedal position sensor 48 that detects a stepping amount of a brake pedal 47. In addition, examples of the signals input to the electronic control unit 30 via the input port also include a vehicle speed from the vehicle speed sensor 49, a wheel speed from the wheel speed sensor 50, acceleration from the acceleration sensor 51, a yaw rate from the yaw rate sensor 52, a road surface gradient from the gradient sensor 53, proximity information from the clearance sonar 54, sunlight information from the sunlight sensor 55, an outside air temperature from the outside air temperature sensor 56, a carbon monoxide concentration (CO concentration) from the CO sensor 57, radar information from the millimeter wave radar 61, and GPS data (positional information) from the GPS 62. Further, examples of the signals input to the electronic control unit 30 via the input port also include signals indicating a state of the engine EG from various sensors attached to the engine EG.

The electronic control unit 30 outputs various control signals via the output port. Examples of the control signals output from the electronic control unit 30 via the output port include a display control signal to the display device 70, a communication control signal to the communication device 72, and an air conditioning control signal to the air conditioning device 74. In addition, examples of the control signals output from the electronic control unit 30 via the output port also include control signals, such as a throttle control signal for controlling the operation of the engine EG, a fuel injection control signal, and an ignition control signal.

The portable terminal 120 is configured as, for example, a smartphone having a microcomputer function and a telephone function. An air conditioning activation application 130 as application software for executing the air conditioning in the occupant cabin of the vehicle 20 by the remote operation is installed in the portable terminal 120, and the portable terminal 120 communicates with the management center 220 via a communication network, such as the Internet or the telephone line, by the process by the air conditioning activation application 130.

The management center 220 includes a user authentication unit 230, an air conditioning activation unit 240, or a communication device 250. The user authentication unit 230 executes authentication that the user is a user of the vehicle 20 with the air conditioning activation application 130 of the portable terminal 120. The authentication can be executed by receiving an identification (ID) code and a password input and transmitted from the portable terminal 120, and determining whether or not an identification (ID) code or a password stored in advance match the identification code of the vehicle 20 and the like. The air conditioning activation unit 240 communicates information needed for controlling driving of the air conditioning device 74 or the engine EG of the vehicle 20 by the remote operation with the air conditioning activation application 130 of the portable terminal 120 or the electronic control unit 30 of the vehicle 20 via the communication device 250.

Figure 3:
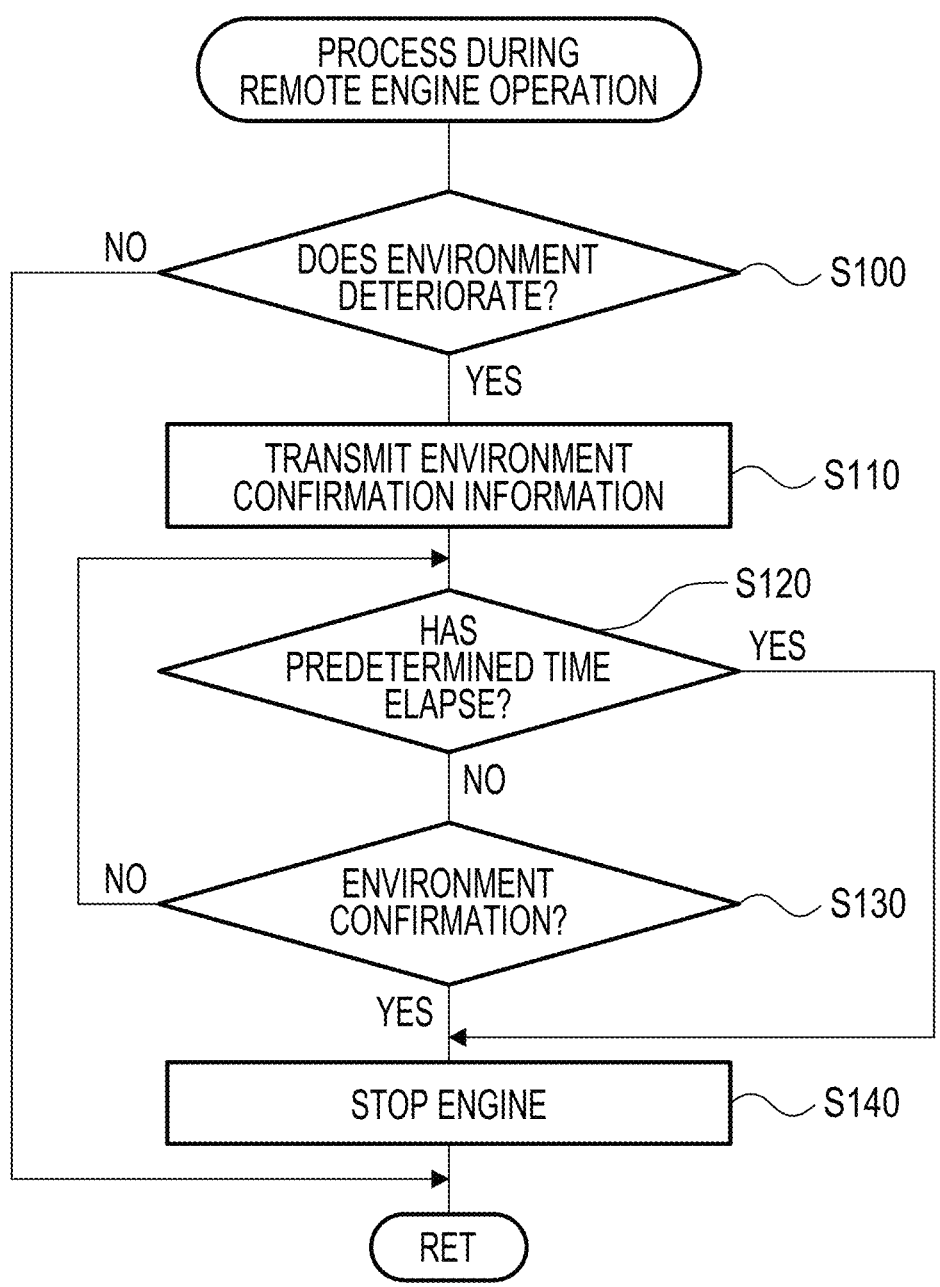
FIG. 3 is a flowchart showing an example of a process during remote engine operation executed by an electronic control unit 30 of the vehicle 20.

In the following, an operation of the information management system 10 configured as described above, particularly an operation after the engine EG is started by the remote operation will be described. The engine EG by the remote operation is started by the following procedure. First, by activating the air conditioning activation application 130 on the portable terminal 120 and tapping an activation button of the air conditioning device 74 by the remote operation, the user authentication unit 230 of the management center 220 executes the user authentication. When the user authentication is confirmed, an air conditioning activation control signal is transmitted from the air conditioning activation unit 240 of the management center 220 to the electronic control unit 30 of the vehicle 20. The electronic control unit 30 of the vehicle 20 that receives the air conditioning activation control signal activates the air conditioning device 74, and a request to start the engine EG is made due to the need for the air conditioning by the air conditioning device 74. The engine EG is started in response to such a request to start the engine EG. FIG. 3 is a flowchart showing an example of a process during remote engine operation executed by the electronic control unit 30 of the vehicle 20 while the engine EG is operated by activating the air conditioning by the remote operation. The process during remote engine operation is repeatedly executed based on the remote operation while the engine EG is operated.

When the process during remote engine operation is executed, the electronic control unit 30 first determines whether or not an ambient environment of the vehicle 20 deteriorates (step S100). The determination can be made by, for example, determining whether or not the CO concentration from the CO sensor 57 is equal to or higher than a predetermined reference concentration, or determining whether or not the outside air temperature from the outside air temperature sensor 56 is equal to or higher than a reference temperature. When the determination is made that the ambient environment of the vehicle 20 does not deteriorate, this process is terminated.

When the determination is made in step S100 that the ambient environment of the vehicle 20 deteriorates, environment confirmation information is transmitted to the portable terminal 120 via the management center 220 (step S110). Based on the environment confirmation information, a message, such as "The ambient environment of the vehicle deteriorates. Please say engine stop", is displayed on a screen of the portable terminal 120. Moreover, when the user inputs the voice of engine stop to the portable terminal 120 before a predetermined time elapses (steps S120, S130), the operation of the engine EG is stopped (step S140), and this process is terminated. Even when the user does not input the voice of engine stop to the portable terminal 120 before a predetermined time elapses (steps S120, S130), the operation of the engine EG is stopped (step S140), and this process is terminated. As described above, by stopping the operation of the engine EG when the determination is made that the ambient environment of the vehicle 20 deteriorates while the engine EG is operated, it is possible to suppress the deterioration of the environmental state around the vehicle 20 or the occupant cabin.

In the vehicle 20 of the embodiment described above, when the determination is made that the ambient environment of the vehicle 20 deteriorates when the engine EG is operated based on the air conditioning activation by the remote operation, the user (remote operator) is notified that the ambient environment of the vehicle 20 deteriorates. As a result, it is possible to notify the user (remote operator) that the ambient environment of the vehicle 20 deteriorates.

In addition, when the determination is made that the ambient environment of the vehicle 20 deteriorates, the engine EG is stopped. As a result, it is possible to suppress the deterioration of the environmental state around the vehicle 20 or the occupant cabin. As a result, it is possible to take more appropriate measures when the engine EG is started based on the remote operation.

As described above, in the vehicle 20 according to the embodiment, when the engine EG is started based on the air conditioning activation by the remote operation, the condition for stopping the engine EG after the engine EG is started is relaxed (engine EG is likely to be stopped) as compared to when the engine EG is started based on the driver getting on the vehicle and activating the system. As a result, it is possible to further reduce the risk when the engine EG is started based on the remote operation. As a result, it is possible to take more appropriate measures with respect of the start of the engine EG based on the remote operation.

Figure 4:
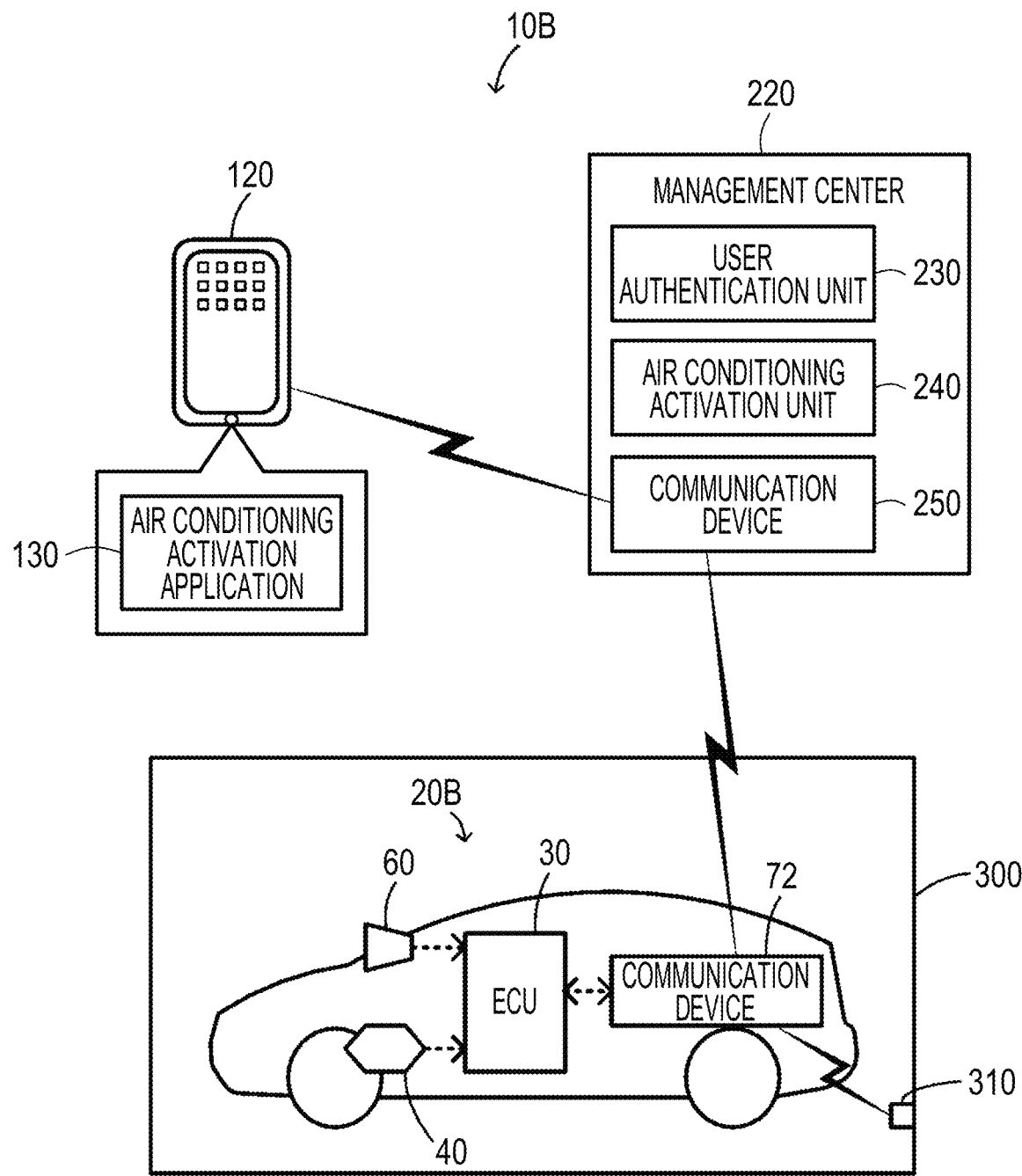
FIG. 4 is a configuration diagram showing an outline of a configuration of an information management system 10B according to a modification example.

In the vehicle 20 according to the embodiment, when the engine EG is operated based on the air conditioning activation by the remote operation, the determination is made as to whether or not the ambient environment of the vehicle 20 deteriorates, by the CO sensor 57 or the outside air temperature sensor 56 mounted on the vehicle. However, as shown in a vehicle 20B of an information management system 10B according to a modification example shown in FIG. 4, the CO concentration from a CO sensor 310 attached to a garage 300 may be acquired by the communication, and the determination may be made as to whether or not the ambient environment of the vehicle 20 deteriorates, based on the acquired CO concentration.

In the vehicle 20 according to the embodiment, the configuration has been adopted in which the motor MG is attached to the input shaft 23 of the automatic transmission device AT connected to the output shaft 21 of the engine EG via the clutch 22, but a hybrid vehicle having any configuration in which the engine is provided may be adopted, or a vehicle may be adopted in which a traveling motor is not provided and the engine and the transmission are provided.

The correspondence relation between the main elements of the embodiment and the main elements of the disclosure described in the Summary section will be described. In the embodiment, the engine EG corresponds to the "engine", the electronic control unit 30 corresponds to the "controller", and the vehicle 20 corresponds to the "vehicle".

Since the embodiment is an example for specifically describing the mode for carrying out the disclosure described in the Summary section, the correspondence relation between the main elements of the embodiment and the main elements of the disclosure described in the Summary section does not limit the elements of the disclosure described in the Summary section. That is, the interpretation of the disclosure described in the Summary section should be made based on the description of the Summary section, and the embodiment is merely a specific example of the disclosure described in the Summary section.

As described above, the mode for carrying out the present disclosure has been described with the embodiment. However, the present disclosure is not limited to such an embodiment, and various modifications can be made without departing from the gist of the present disclosure.

The present disclosure can be used in the manufacturing industry of the vehicle and the like.

What is claimed is:

1. A vehicle, comprising:
   an engine; and
   a central processing unit configured to start the engine based on a remote operation, wherein
   the central processing unit is further configured to,
      in response to a condition for stopping the engine being satisfied in a case where the engine is started based on the remote operation, stop the engine, and
      in response to the condition for stopping the engine being satisfied in a case where the engine is started by operating a switch in an occupant cabin, allow the engine to run, and the condition for stopping the engine is satisfied where a determination is made that an ambient environment of the vehicle is not a predetermined appropriate environment based on a detection value from an ambient environment detection sensor configured to detect the ambient environment of the vehicle.

2. The vehicle according to claim 1, wherein
the ambient environment detection sensor is (i) an outside air temperature sensor mounted on the vehicle or (ii) a carbon monoxide concentration sensor mounted on the vehicle.

3. The vehicle according to claim 1, wherein:
the ambient environment detection sensor is (i) an outside air temperature sensor installed outside the vehicle or (ii) a carbon monoxide concentration sensor installed outside the vehicle; and
the central processing unit is configured to acquire the detection value from the ambient environment detection sensor by communication.

4. The vehicle according to claim 1, wherein
the central processing unit is configured to, in response to the determination being made that the ambient environment of the vehicle is not the predetermined appropriate environment,
transmit an environment confirmation information, and request an input of instruction to stop the engine.

5. The vehicle according to claim 4, wherein
the central processing unit is configured to, in response to (i) receiving the input of instruction to stop the engine or (ii) an absence of receiving the input of instruction to stop the engine after an elapse of a predetermined time, stop the engine.

\* \* \* \* \*